United States Patent
Mueller et al.

(10) Patent No.: US 11,499,861 B2
(45) Date of Patent: Nov. 15, 2022

(54) RADAR MODULE

(71) Applicant: VEGA GRIESHABER KG, Wolfach (DE)

(72) Inventors: Christoph Mueller, Oppenau (DE); Steffen Waelde, Niedereschach (DE)

(73) Assignee: VEGA GRIESHABER KG, Wolfach (DE)

( * ) Notice: Subject to any disclaimer, the term of this patent is extended or adjusted under 35 U.S.C. 154(b) by 162 days.

(21) Appl. No.: 16/793,944

(22) Filed: Feb. 18, 2020

(65) Prior Publication Data
US 2020/0264030 A1    Aug. 20, 2020

(30) Foreign Application Priority Data
Feb. 18, 2019 (EP) .................................. 19157746

(51) Int. Cl.
| | |
|---|---|
| G01F 23/284 | (2006.01) |
| G01S 7/03 | (2006.01) |
| G01S 13/08 | (2006.01) |
| H01Q 1/22 | (2006.01) |
| G01S 7/02 | (2006.01) |

(52) U.S. Cl.
CPC ............ *G01F 23/284* (2013.01); *G01S 7/032* (2013.01); *G01S 13/08* (2013.01); *H01Q 1/2283* (2013.01); *G01S 7/028* (2021.05)

(58) Field of Classification Search
CPC .. G01F 23/284; G01F 25/0061; G01S 13/885; G01S 13/08; G01S 7/032; G01S 7/027; G01S 7/028; G01S 7/03; H01Q 1/2283; H01Q 1/225; H01Q 13/02; H01P 5/107; H01P 5/08; H01P 3/121

USPC .......................................... 342/22, 175, 124
See application file for complete search history.

(56) References Cited

U.S. PATENT DOCUMENTS

| | | | | |
|---|---|---|---|---|
| 6,686,872 | B2 * | 2/2004 | Vacanti | G01S 7/4004 343/872 |
| 7,009,408 | B2 * | 3/2006 | Maier | G01F 23/284 324/642 |
| 7,068,213 | B2 * | 6/2006 | Muller | G01F 23/284 73/290 R |

(Continued)

FOREIGN PATENT DOCUMENTS

| | | |
|---|---|---|
| DE | 10 2007 042 043 A1 | 3/2009 |
| DE | 10 2009 028 620 A1 | 2/2011 |

(Continued)

OTHER PUBLICATIONS

Extended European Search Report dated Jul. 26, 2019 in Patent Application No. 19157746.9, 9 pages.

*Primary Examiner* — Erin F Heard
*Assistant Examiner* — Michael W Justice
(74) *Attorney, Agent, or Firm* — Oblon, McClelland, Maier & Neustadt, L.L.P.

(57) ABSTRACT

A radar module for level and/or limit level monitoring in plant automation, comprising a radar signal source that generates and transmit a radar signal, the radar signal source having a surface facing a filling material, a radar signal conductor that receives, conducts and emits the radar signal, the radar signal conductor being mounted on the surface of the radar signal source, and a potting compound that at least partially covers the surface of the radar signal source and at least partially covers the radar signal conductor.

13 Claims, 1 Drawing Sheet

(56) References Cited

U.S. PATENT DOCUMENTS

| | | | | |
|---|---|---|---|---|
| 8,184,039 | B2* | 5/2012 | Garrod | G01F 1/002 |
| | | | | 342/124 |
| 8,269,666 | B2* | 9/2012 | Schultheiss | H01L 23/552 |
| | | | | 342/124 |
| 8,504,135 | B2* | 8/2013 | Bourqui | H01Q 13/085 |
| | | | | 600/407 |
| 9,086,311 | B2* | 7/2015 | Wegemann | G01F 23/284 |
| 9,212,942 | B2* | 12/2015 | Weinzierle | H01P 5/08 |
| 2003/0071753 | A1* | 4/2003 | Vacanti | G01S 7/4004 |
| | | | | 342/173 |
| 2010/0060512 | A1* | 3/2010 | Garrod | H01Q 13/24 |
| | | | | 342/124 |
| 2010/0103024 | A1* | 4/2010 | Schultheiss | H01L 23/055 |
| | | | | 73/290 R |
| 2010/0145190 | A1* | 6/2010 | Bourqui | H01Q 13/085 |
| | | | | 600/425 |
| 2010/0182207 | A1* | 7/2010 | Miyata | H01Q 1/364 |
| | | | | 343/702 |
| 2013/0057366 | A1* | 3/2013 | Wegemann | H01Q 13/02 |
| | | | | 333/239 |
| 2014/0009323 | A1* | 1/2014 | Weinzierle | H01P 5/08 |
| | | | | 342/124 |

FOREIGN PATENT DOCUMENTS

| | | |
|---|---|---|
| DE | 10 2015 119 690 A1 | 5/2017 |
| DE | 10 2017 112 894 A1 | 12/2018 |

\* cited by examiner

RADAR MODULE

CROSS-REFERENCE TO RELATED APPLICATIONS

This application claims the benefit of the filing date of European Patent Application No. 19 157 746.9 filed on 18 Feb. 2019 the entire contents of which is incorporated herein by reference.

FIELD

The disclosure relates to a radar module for level and/or limit level monitoring, for example in plant automation, the use of a radar module, and a method for manufacturing a radar module.

TECHNICAL BACKGROUND

A large number of radar modules are used in plant automation, especially in level and limit level measurement technology. To ensure that the radar module remains fully functional, different configurations may be provided or protective measures may be taken. The semiconductor circuit of a radar module is made of crystalline or semi-crystalline material, which can be sensitive to shocks or external force. In addition, it may not be possible to tell from the outside of the radar module, whether the semiconductor circuit is damaged or defective, so that all components must be taken into account when investigating the cause of a radar module failure.

SUMMARY

With the embodiments described below, an improved radar module may be provided in an advantageous way.

One aspect relates to a radar module for level and/or limit level monitoring, in particular in plant automation, which comprises a radar signal source which is set up to generate, transmit and/or receive a radar signal. The radar signal source may have a surface which faces a medium which the radar module is to monitor or whose level and/or limit level the radar module is to measure. In addition, the radar module may include a radar signal conductor, which may be designed to receive, transmit and/or emit the radar signal. The radar signal conductor can be attached to the surface of the radar signal source. In addition, the radar module comprises a casting or pottig compound, the casting compound covering at least partially the surface of the radar signal source and at least partially the radar signal conductor. The radar signal source may be an integrated circuit (die) on a semiconductor chip.

An advantage of this design may be that the radar signal source, and in particular an antenna of the radar signal source, is protected against moisture or other environmental influences by means of the casting compound. Another advantage may be that the radar signal conductor can be attached to the radar signal source using the casting compound. In addition, another advantage may be that by contacting the radar signal conductor at the radar signal source with the potting compound, an assembly step may be saved and thus the costs of the radar module may be reduced.

In other words, a radar signal conductor is held on a radar signal source by the potting compound contacting the two components. The radar signal source can generate and/or emit a radar signal, whereby the radar signal conductor can pick up the radar signal, pass it through itself and then emit it again, especially in the direction of a product. The radar signal conductor may also be designed to feed the radar signals into an antenna array. Furthermore, the radar signal conductor may have an end facing away from a medium, this end being at least partially attached to the radar signal source. At least partially fixed in this design example means that the radar signal conductor forms a continuous contact surface with the radar signal source, and/or only partially forms a contact surface with the radar signal source, especially if a kind of foot or socket positions the radar signal conductor above the radar signal source at a defined distance. The encapsulant can be a foam, gel or plastic composite, which is injected into the radar module by a process such as injection or plastic injection moulding. In particular, the potting compound can develop a bonding effect so that the radar signal conductor and the radar signal source adhere to the potting compound. The potting compound may in particular be designed to protect the radar signal source and/or the radar signal conductor from environmental influences such as moisture or similar. In addition, the potting compound may help to improve the stability of the radar signal source and a mechanical impact on the radar signal conductor does not have a negative effect on the radar signal source.

According to an embodiment, the potting compound fixes the radar signal conductor to the surface of the radar signal source. In other words, the potting compound may form a positive and/or material bond between the radar signal conductor and the surface of the radar signal source. For example, the potting compound may consist of a plastic foam which is applied to the surface of the radar signal source when the radar signal conductor is mounted on the surface of the radar signal source and that the potting compound thus fixes the radar signal conductor to the radar signal source. This can have the advantage that a further assembly step, e.g. a connection between the radar signal conductor and the radar signal source, can be omitted, thus reducing the manufacturing costs of the radar module. Furthermore, this design can have the advantage that the radar signal source, especially an antenna arrangement of the radar signal source, is protected against environmental influences such as humidity.

According to an embodiment, a permittivity of the potting compound can be smaller than a permittivity of the radar signal conductor. In other words, the permittivity of the potting compound is selected in relation to the radar signal conductor, so that the permittivity of the potting compound is less than the permittivity of the radar signal conductor. This can have the advantageous effect that the radar signal which is conducted and/or emitted by the radar signal conductor is not decoupled into the potting compound but is emitted at the tip or the side of the radar signal conductor facing the medium or can be coupled into an antenna arrangement.

According to an embodiment, the radar module may comprise a carrier, with the radar signal source attached to the carrier. The carrier can be a chip carrier, for example a QFN package, in which case the radar signal source is bonded to the chip carrier. The connection between the radar signal source and the carrier can be made by means of the potting compound, so that no further adhesive or connection is required, thus further increasing the effectiveness of the assembly process.

According to an embodiment, the radar signal source can be fixed to the carrier by means of a material, form and/or frictional connection. In other words, the radar signal source is detachably or non-detachably connected to the carrier, especially a chip carrier. This can contribute to mechanical stabilization of the radar signal source. In addition, the material, form and/or force-locking connection can be formed by the potting compound. Alternatively, the material, form and/or force-locking connection can also be made by means of a soldering process, in which case the radar signal source is soldered to the carrier. In other designs, technologies for the usual contacting of radar signal sources to carriers may also be used.

According to an embodiment, the positive, material and/or frictional connection can be formed by the potting compound which fixes the radar signal source to the carrier. In other words, the radar signal source is positioned on the carrier and then attached to the carrier with the potting compound. In particular, the potting compound can be applied on the surface of the radar signal source and on the carrier so that a transition between the surface of the radar signal source and the surface of the carrier is formed by the potting compound which fixes the radar signal source to the carrier. This may have the advantage that assembly, for example by means of a soldered connection or a screw connection of the radar signal source, can be saved, thus further reducing the manufacturing costs of the radar module. In addition, there is the advantage that no moisture or the like can get between the radar signal source and the carrier through the potting compound and thus corrosion of the underside of the radar signal source or the upper side of the carrier can be excluded.

According to an embodiment, the radar signal source can be connected to the carrier, especially by bonding wires. In this context, "connected" may mean that the radar signal source is connected to the carrier in such a way that a power supply from the carrier to the radar signal source can be guaranteed. In addition, "connected" may mean that information and/or control signals can be passed from the carrier to the radar signal source. This signal connection may be made by bonding wires or other connection techniques, such as conductive digital printing. In particular, this may have the advantage that no further contacting mechanisms are necessary, since the bonding wires provide a simple and safe connection method that may further increase the service life of the radar module. In addition, the potting compound can also completely enclose the bonding wires so that no moisture may get to the bonding wires.

According to an embodiment, the radar module may comprise a housing, the housing enclosing at least the surface of the radar signal source and/or the carrier. In other words, the housing of the radar module can enclose or cover the radar signal source and the carrier, so that both the radar signal source and the carrier are protected from environmental influences. In addition, the housing is designed in such a way that it serves for mechanical stabilization. The housing can be designed to absorb forces acting on the radar module and not to transmit them to the radar signal source and/or carrier. This may have the advantage that in certain application scenarios the radar module would not be suitable without the housing, but by providing a housing the radar module can meet the requirements and thus improve the application possibilities of the radar module.

According to an embodiment, the potting compound can connect the radar signal source and/or the carrier to the housing. In other words, the radar signal source is mounted on the carrier and then the carrier is mounted in the housing. A potting compound can then be added to the radar module so that the potting compound can connect, and in particular define, the radar signal source, the carrier and the housing. This can have the advantage that assembly steps can be saved, since the components make contact with each other through the potting compound and thus individual assembly, such as soldering connections, is no longer necessary. It may also be provided that the potting compound is not in contact with the housing.

According to an embodiment, the radar module can have a waveguide, whereby the waveguide has an opening. The opening can be a bore or an extrusion from a solid body. The opening forms an axial direction, for example the central axis of a pipe. In addition, the radar signal conductor can project into the opening in such a way that the waveguide and the radar signal conductor overlap along the axial direction to couple the radar signal from the radar signal conductor into the waveguide. In other words, the radar signal conductor is located on the radar signal source, with the radar signal conductor projecting into an opening of a waveguide in such a way that the radar signal conductor and the waveguide overlap. The overlap may be such that the radar signal coming from the radar signal source and passing through the radar signal conductor can be coupled into the waveguide. The axial direction can be especially orthogonal to the surface of the radar signal source. This may have the advantage that the coupling of the radar signal into a waveguide is improved in such a way that all components are fixed by means of the potting compound, thus providing a more robust radar module, especially against environmental influences.

According to an embodiment, the potting compound can have a plastic composite, a synthetic resin composite, a foil and/or a foil provided with additives. In other words, the potting compound can be formed from a resin cast by the glob-top process, a plastic composite applied by micro-injection molding, or a film applied by a FAM (Film Assisted Molding) process. In addition, the potting material can be a gel, foam or similar. The advantage of this design can be that the manufacturing costs of the radar module can be further reduced by means of a highly automated production process.

According to an embodiment, the radar signal conductor can be made of a dielectric, in particular a metal compound and/or a plastic compound. A dielectric can be a polyethylene, PTFE, ceramic, steatite, aluminum oxide, or mica. Alternatively, the radar signal conductor can also be designed as a turned part or plastic injection-moulded component. By means of the above-mentioned production technologies, high profitability can be guaranteed, so that the costs of the radar module can be further reduced by means of the radar signal conductor manufactured in this way.

Another aspect relates to the use of a radar module, as described above and below, for level and/or limit monitoring in plant automation.

Another aspect relates to a method for manufacturing a radar module, which may include the following steps:

Positioning a radar signal conductor above and/or on a radar signal source,

Applying a potting compound to at least partially cover the radar signal conductor and the radar signal source and to fix the radar signal conductor to the radar signal source. In other words, a radar signal conductor is positioned on a radar signal source so that the radar signal conductor is positioned in particular above an antenna array. As soon as the radar signal conductor is positioned above the radar signal source, a potting compound is applied which at least partially covers the radar signal source and the radar signal conductor. This serves in particular to fix or fix the radar signal conductor to the radar signal source and thus to position it permanently. This may have the advantage that a further assembly step, e.g. contacting the radar signal conductor at the radar signal source by means of soldering, can be omitted, since the potting compound is designed to fix the radar signal conductor permanently or permanently to the radar signal source.

According to another embodiment, the method includes the steps of.

Positioning the radar signal source on a carrier,
Fixing of the radar signal source on the carrier by means of the potting compound.

In other words, the radar signal source is positioned on the carrier and then permanently fixed to the carrier with the help of the potting compound. The potting compound can form a connection or bridge between the carrier and the radar signal source so that the radar signal source is held down on the carrier. This can have the advantage that no moisture can penetrate between the carrier and the radar signal source.

According to an embodiment, the method can also include the steps:

Mounting a housing which at least partially encloses the radar signal source and/or the carrier,
Filling a cavity inside the housing with the potting compound.

In other words, the radar signal source and the carrier are enclosed or protected by a housing. The housing can be fixed to a component by means of a screw connection or similar, to which the carrier can also be fixed. A cavity can be created between the carrier, which contains the radar signal source, and the housing, which can be filled by means of the potting compound. This creates a connection between the radar signal source, the carrier and the housing, so that all components are protected from penetrating moisture or other environmental influences.

Features and elements of the measuring instrument as described above and below may also be implemented as corresponding features, elements and steps of the method as described above and below and vice versa.

Another aspect relates to a program element which, when executed on a production line, instructs the production line to perform the steps of the procedure as described above and below.

Another aspect relates to a computer-readable medium on which a program element, as described above and below, is stored.

In the following, embodiments are described with reference to the figures.

SHORT DESCRIPTION OF THE FIGURES

The figures are merely schematic and not true to scale. In the figures, identical, equal-acting or similar elements can be provided with the same reference signs.

DETAILED DESCRIPTION OF EMBODIMENTS

Figure 1:
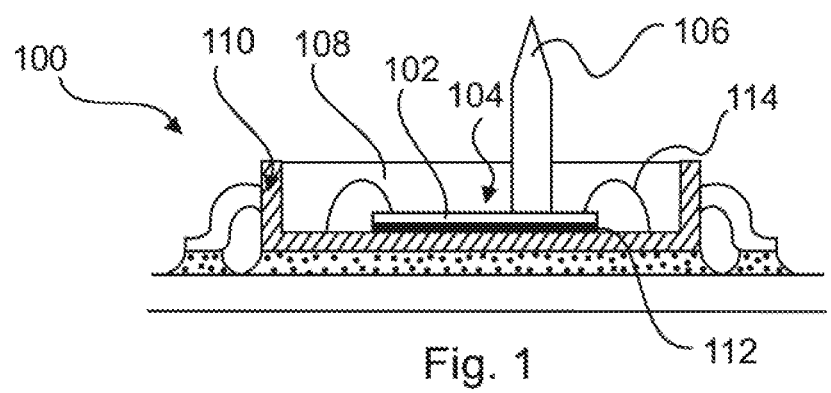
FIG. 1 shows a schematic section of a radar module according to an embodiment.

FIG. 1 shows a schematic section through the radar module 100 according to an embodiment. The radar module 100 has a radar signal source 102, which is fixed to a carrier 110 by means of a form, material and/or frictional connection 112.

The non-positive connection is, for example, an adhesive that is different from the potting compound. This is represented in FIGS. 1 and 2 by the thick black layer between carrier 110 and radar signal source 102.

The radar signal source 102 has a surface 104, which faces a medium. The radar signal conductor 106 is located on surface 104. The radar signal conductor 106 is attached to the radar signal source 102 by means of a potting compound 108. Sealing compound 108 also determines the radar signal source on carrier 110. The radar signal source 102 is in signal connection with the carrier 110 by means of a bonding wire 114, and the bonding wire 114 is also covered by the potting compound 108, so that it is also protected from environmental influences. Thus, with the help of the potting compound 108, a high tightness of the radar module 100 can be guaranteed. In particular, the radar signal source 102 and its contacting is protected against environmental influences and its stability against mechanical influences is improved.

Figure 2:
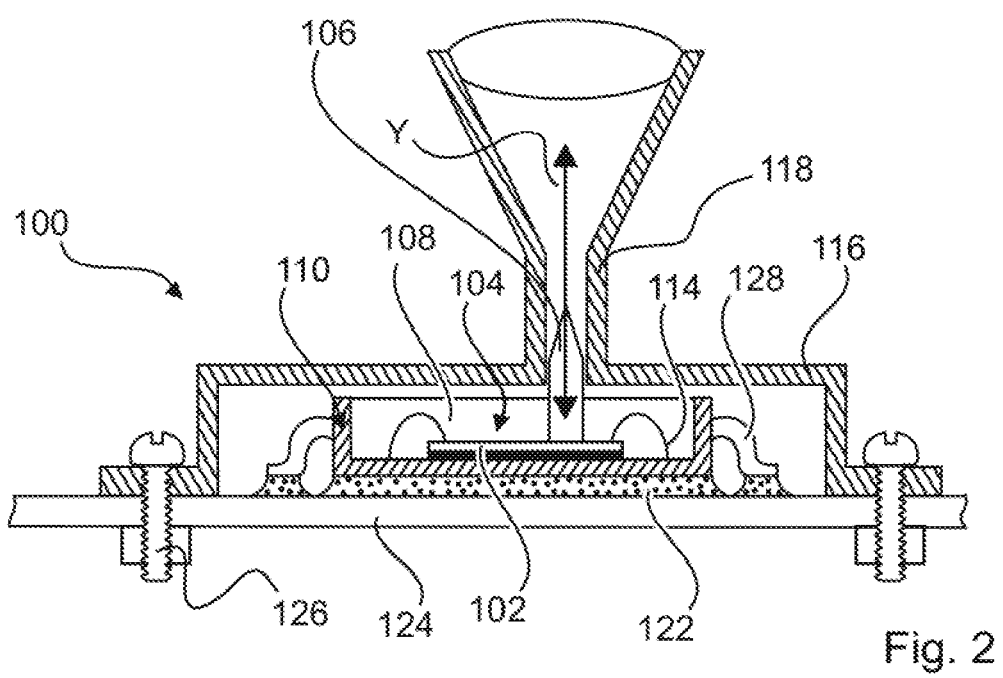
FIG. 2 shows a schematic section through a radar module according to an embodiment.

FIG. 2 shows a schematic section of a radar module according to an embodiment. The radar module 100 is attached to a component 124, for example a printed circuit board, by means of screws 126. In addition to the screws 126, there is a further positive, material and/or frictional connection 122 between the radar module 100 and the component 124. The material, positive and/or frictional connection 122 fixes the carrier 110 to the component 124. In addition, the carrier 110 can be in signal connection to the component 124 via bonding wires 128. The carrier 110 has a radar signal source 102, which has a surface 104. The radar signal source is fixed to the carrier 110 by means of the potting compound 108. The radar module 100 also has a housing 116. The 116 housing also features a waveguide 118, which may include a horn antenna and a dielectric lens. The radar signal conductor 106 projects into the waveguide 118. The waveguide 118 and the radar signal conductor 106 overlap along an axial direction Y, which is preferably orthogonal to surface 104. The overlap can be used to compensate for a variance in the extension length of joint 122 or to enable a wide tolerance of joint 122.

Figure 3:
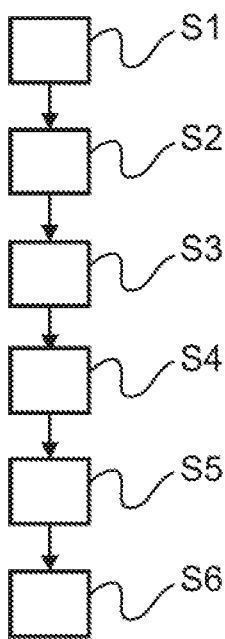
FIG. 3 shows a flowchart illustrating steps of a method of manufacturing a radar module according to an embodiment.

FIG. 3 shows a flowchart illustrating the steps of a method of manufacturing a radar module according to an embodiment. The method comprises a positioning step S1, during which a radar signal conductor is positioned on and/or above a radar signal source. In addition, the method comprises the step S2, i.e., applying a potting compound, at least partially to a radar signal conductor and/or the radar signal source to attach these two components to each other. Furthermore, the method comprises the positioning step S3, in which a radar signal source is positioned on the carrier. In addition, the method may include the fixing step S4, where the radar signal source is fixed on the carrier by means of the potting compound. In addition, the method may include the step of mounting S5 of a housing, the housing at least partially enclosing the radar signal source and/or carrier. Furthermore, the method may include the step of filling S6 of a cavity within the housing with the potting compound.

The steps of the procedure may be carried out in this order or in any other conceivable order.

Figure 4:
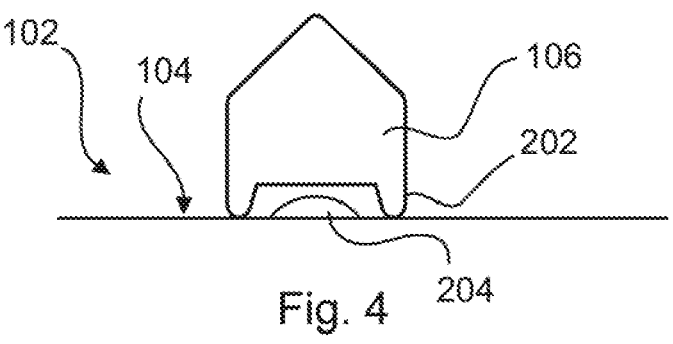
FIG. 4 shows a section of a radar module according to an embodiment.

FIG. 4 shows a schematic section of the radar module 100, wherein the radar signal source 102 has a surface 104. The radar signal source comprises an antenna array 204, which is arranged on the surface 104. The radar signal conductor 106 is located above the antenna array 204. The radar signal conductor 106 may include a mounting element 202, which provides a distance between the radar signal conductor 106 and the antenna array 204. This arrangement may have a particularly positive effect on the coupling of the radar signal, which is transmitted by the antenna arrangement 204 and received by the radar signal conductor 106. In particular, the radar signal conductor 106 may be arranged on the radar signal source by means of an encapsulant in form of, for example, a potting compound 108, whereby the feet 202 ensure that an antenna structure 204 remains free from the encapsulant 108.

In addition, it should be noted that comperising and 'having' do not exclude other elements and the indefinite articles 'a' or 'an' do not exclude a multitude. It should also be noted that characteristics described with reference to one of the above embodiments may also be used in combination with other characteristics of other embodiments described above. Reference signs in the claims are not to be regarded as a restriction.

The invention claimed is:

1. A radar module for level and/or limit monitoring, comprising:
    a radar signal source configured to generate, transmit, and receive a radar signal, wherein the radar signal source has a surface facing a filling material;
    a radar signal conductor configured to receive, conduct, and emit the radar signal, wherein the radar signal conductor is mounted on the surface of the radar signal source;
    a housing, which at least partially encloses the radar signal source and the radar signal conductor, the housing having a waveguide, wherein the housing and the radar signal source are fixed to a common component;
    a potting compound, wherein the potting compound at least partially covers the surface of the radar signal source and partially covers the radar signal conductor for attaching the radar signal conductor to the radar signal source, and wherein the potting compound does not connect the radar signal source to the housing; and
    a waveguide,
    wherein the waveguide has an opening,
    wherein the opening forms an axial direction, and
    wherein the housing is designed to absorb external forces acting on the radar module and not to transmit them to the radar signal source by way of the potting compound not connecting the radar signal source to the housing and by way of the radar signal conductor projecting into the opening such that the waveguide and the radar signal conductor form an overlap along the axial direction to couple the radar signal into the waveguide.

2. The radar module according to claim 1, wherein a permittivity of the potting compound is less than a permittivity of the radar signal conductor.

3. The radar module according to claim 1, wherein the radar module includes a carrier,
    wherein the radar signal source is attached to the carrier.

4. The radar module according to claim 3, wherein the radar signal source is fixed to the carrier by way of a material, form and/or force-locking connection.

5. The radar module according to claim 4, further a second compound fixes the radar signal source to the carrier.

6. The radar module according to claim 1,
    wherein the housing encloses at least the surface of the radar signal source and/or a carrier.

7. The radar module according to claim 6, wherein the potting compound does not connect the carrier to the housing.

8. The radar module according to claim 1, wherein the potting compound includes one or more from a group consisting of a plastic composite, a synthetic resin composite, a film, and a film provided with additives.

9. A fill level radar comprising:
    a radar module for level and/or limit monitoring according to claim 1, including:
    a radar signal source configured to generate, transmit, and receive a radar signal, wherein the radar signal source has a surface facing a filling material;
    a radar signal conductor configured to receive, conduct, and emit the radar signal, wherein the radar signal conductor is mounted on the surface of the radar signal source; and
    a potting compound, wherein the potting compound at least partially covers the surface of the radar signal source and partially covers the radar signal conductor.

10. A method of manufacturing a radar module for level and/or limit monitoring, including a radar signal source configured to generate, transmit, and receive a radar signal, wherein the radar signal source has a surface facing a filling material, a radar signal conductor configured to receive, conduct, and emit the radar signal, wherein the radar signal conductor is mounted on the surface of the radar signal source, a housing, which at least partially encloses the radar signal source and the radar signal conductor, the housing having a waveguide, wherein the housing and the radar signal source are fixed to a common component, a potting compound, wherein the potting compound at least partially covers the surface of the radar signal source and partially covers the radar signal conductor for attaching the radar signal conductor to the radar signal source, and wherein the potting compound does not connect the radar signal source to the housing, and a waveguide, wherein the waveguide has an opening, wherein the opening forms an axial direction, and wherein the housing is designed to absorb external forces acting on the radar module and not to transmit them to the radar signal source by wav of the potting compound not connecting the radar signal source to the housing and by way of the radar signal conductor projecting into the opening such that the waveguide and the radar signal conductor form an overlap along the axial direction to couple the radar signal into the waveguide, comprising:
    positioning a radar signal conductor above and/or on a radar signal source; and
    applying a compound for partially covering the radar signal conductor and the radar signal source and for fixing the radar signal conductor to the radar signal source.

11. The method according to claim 10, further comprising:
    positioning the radar signal source on a carrier; and
    fixing the radar signal source on the carrier by way of the compound.

12. The method according to claim 10, further comprising:
    mounting the housing which at least partially encloses the radar signal source and/or a carrier; and
    filling a cavity inside the housing with the compound.

13. The method according to claim 11, further comprising:
    mounting the housing which at least partially encloses the radar signal source and/or the carrier; and
    filling a cavity inside the housing with the compound.

* * * * *